REDUNDANT MAJORITY VOTER

Filed Oct. 18, 1965

INVENTOR
WILLIAM B. TOBIN
BY Seghrue, Rothwell, Mion, Zinn & Macpeak
ATTORNEYS

United States Patent Office 3,524,073
Patented Aug. 11, 1970

3,524,073

REDUNDANT MAJORITY VOTER

William B. Tobin, Littleton, Colo., assignor to Martin-Marietta Corporation, New York, N.Y., a corporation of Maryland Filed Oct. 18, 1965, Ser. No. 497,352
Int. Cl. H03k 19/42
U.S. Cl. 307—211 1 Claim

ABSTRACT OF THE DISCLOSURE

A three input majority voter is disclosing having "and," "or" logic elements arranged to provide redundant circuit paths for the three inputs thereby providing operation even if any one of the logic elements fails.

This invention relates to a three input majority voter having redundant paths for certain input combinations so that a correct output will still be produced in the event that any one of the individual logic components fails.

Majority voters are logic circuits which produce an output whenever a majority of the possible inputs are present, and these circuits have found increasing recent use in data processing systems to implement specified decision making functions. The simplest and most common majority voters are three input devices that register an output when any two or more of the inputs are present. Given three inputs, A, B and C, the most prevalent prior art technique for implementing a majority voting function has involved the use of three AND gates feeding a single OR gate. The AND gates are individually provided with the input combinations AB, AC and BC, and the voter will thus produce an output at the OR gate when any one or more of the combinations are satisfied. Expressed in terms of Boolean algebra, an output$=AB+AC+BC$. This prior art arrangement suffers from the serious drawback that a circuit failure in the OR gate results in a complete breakdown of the voter, since all of the AND gate outputs converge in the single component. The only known treatments of this problem have been to either duplicate the OR gate in a parallel or redundant circuit fashion, or to provide an alarm device for detecting a gate failure and signalling same to the machine operator, both of which are not only costly, but further increase the circuit complexity and introduce additional sources of error.

It is a primary object of this invention to provide a three input majority voter which overcomes the above disadvantages of the prior art devices, by providing redundant circuit paths for certain input combinations while using the same number of gate components.

It is a further object of this invention to provide such a voter which will function properly for said input combinations in the event of any type of failure in any one of the individual gate components, and which implements these objects using only AND and OR logic gates.

These and further objects and advantages will be readily apparent to those skilled in the art from a consideration of the following more detailed description of the invention, taken in conjunction with the drawings, in which.

Figures 1, 2, 3, 4:
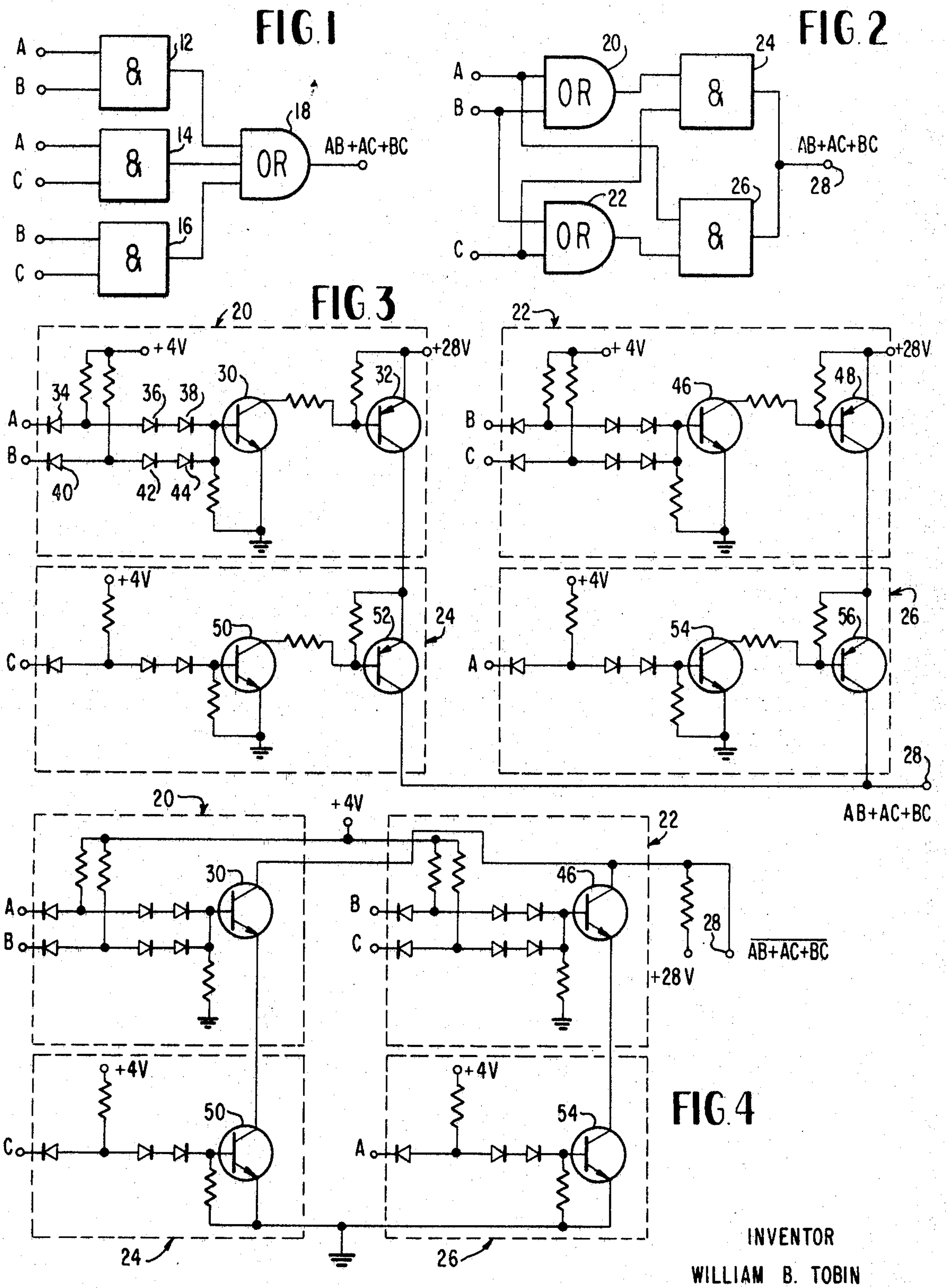
FIG. 1 shows a block diagram of a three input majority voter of the prior art.
FIG. 2 shows a block diagram of a three input majority voter constructed in accordance with the teachings of this invention.
FIG. 3 shows a schematic circuit diagram of the voter shown in FIG. 2.
FIG. 4 shows a schematic circuit diagram of a modified redundant voter having an inverted output.

Referring now to the drawings, the prior art voter of FIG. 1 is seen to comprise three AND gates 12, 14 and

16, supplied respectively with inputs AB, AC and BC, feeding the single OR gate 18. It is readily apparent that with such an arrangement, the failure of OR gate 18 renders the entire voter inoperative.

A majority voter embodying the teachings of this invention effectively overcomes this serious defect of the prior art device for at least half of the possible input combinations while still utilizing only four logic gate components. As shown in FIG. 2, such a voter includes just two OR gates 20 and 22 and two AND gates 24 and 26. Input A is applied to OR gates 20 and AND gate 26. Input B is applied to OR gates 20 and 22 and input C is applied to OR gate 22 and AND gate 24. The second inputs to AND gates 24 and 26 are supplied by the outputs from OR gates 20 and 22, respectively, and the outputs for the AND gates converge at termnal 28.

In a three input majority voter, there are four possible input combinations which should, by definition, produce an output, i.e. AB, AC, BC and ABC. If inputs A and B are applied to the voter shown in FIG. 2, they both actuate OR gate 20 which supplies one of the conditioning signals to AND gate 24, input B actuates OR gate 22 which supplies one of the conditioning signals to AND gate 26 and input A supplies the other conditioning signal directly to AND gate 26. The latter, therefore, produces the proper output at terminal 28 to indicate that at least two of the three inputs are satisfied. Although only one circuit path, through OR gate 22 and AND gate 26, exists for this input combination, note that OR gate 20 and AND gate 24 play no operative role and therefore any type of failure, such as a short circuit or an open circuit, in either one or both of these components would not effect the output. In a similar manner, the presence of inputs B and C would actuate OR gates 20 and 22 and AND gate 24, with the latter providing the proper output at terminal 28. Once again, the failure of gates 22 and/or 26 would not effect the output. Considering now the situation where inputs A and C are satisfied, it will be seen that input A actuates OR gate 20 to condition AND gate 24 and directly conditions AND gate 26. Similarly, input C actuates OR gate 22 to condition AND gate 26 and directly conditions AND gate 24. Under these circumstances, AND gates 24 and 26 are both actuated to produce redundant outputs at terminal 28, and redundant, parallel circuit paths therefore exist for the input combination AC. With parallel paths established in this manner, it is clear that a failure of any type in any one of the four logic gates would have no effect on the proper output. Furthermore, both gates 20 and 24 or gates 22 and 26 could even fail and the output would remain unaffected.

In the remaining situation where all of the inputs A, B and C are satisfied, once again all four of the gates are actuated and redundant outputs are produced over parallel circuit paths through gate pairs 20, 24 and 22, 26. As was the case for inputs A and C, any single gate failure of any type or a double failure of either of the gate pairs would have no effect on the output.

It may now be more fully appreciated that this invention provides a novel three input majority voter having the same number of logic gates as the prior art voters, but connected in such a manner that for two of the four possible input combinations which should produce an output, a circuit failure of any type in any one of the gates has no effect on the output.

While the block diagram of FIG. 2 may be implemented using any one of a number of AND and OR gate circuits well known in the art, one specific form of such a circuit arrangement is shown by way of example in FIG. 3. OR gate 20 is seen to comprise an NPN transistor 30 whose collector is connected to the base of a PNP transistor 32. Inputs A and B are coupled to the base of transistor 30 through diode networks 34, 36, 38 and 40, 42, 44, respectively. OR gate 22 is identical to OR gate 20 and includes transistors 46 and 48 with inputs B and C coupled to the base of transistor 46 through diode networks. AND gates 24 and 26 also have circuit configurations similar to the OR gates, but involving only single direct input terminals C and A, respectively, with the second inputs being supplied by the collector outputs of transistors 32 and 48. Transistors 50 and 52 are included in AND gate 24 and transistors 54 and 56 are connected as shown in AND gate 26.

In operation, all of the inputs A, B and C are normally at ground potential and the diodes immediately adjacent the input terminals are forward biased. By reason of the voltage drops across the resistors connected to the four volt power supplies, the bases of transistors 30, 46, 50 and 54 are therefore also at ground potential and the transistors are non-conductive. This renders the base potential of transistors 32 and 48 at the same 28-volt level as their emitters, and these transistors are also non-conductive, which in turn cuts off transistors 52 and 56.

Assume now that inputs A and C are satisfied by the raising of their input terminals to a five-volt level. Looking at OR gate 20, this reverse biases diode 34 and raises the base potential of transistor 30 to four volts, turning the latter on. This in turn places the base potential of transistor 32, by means of a resistive drop, below the 28 volt emitter potential to render transistor 32 conductive. In a similar manner transistors 46 and 48, 50 and 52, and 54 and 56 are also turned on since one of inputs A and C is applied to each of the four gates. With all of the transistors conductive, the potential of the output terminal 28 is raised from 0 to 28 volts, thus signalling the satisfaction of at least two of the three inputs. Since the output potential in drawn through both transistor pairs 32, 52 and 48, 56, thus establishing redundant circuit paths, it is readily apparent that a failure of any type in any one of the four gates will have no effect on the output.

In some situations it is desirable to produce an output when two or more of the inputs are not satisfied, and an inverting voter for implementing this form of operation is shown in FIG. 4. As may be seen from a comparison of FIGS. 3 and 4, the gate circuitry involved is very similar in both cases. In FIG. 4 the PNP transistors of FIG. 3 have been eliminated and the output is taken from the coupled collectors of transistors 30 and 46 in the OR gates. The block diagram configuration remains the same as that shown in FIG. 2, however, since it is necessary for one of the OR gates to turn on and for an external input to be applied to the associated AND gate in order to produce an output.

In operation, all of the transistors are normally off as in FIG. 3 and the inputs are all at ground potential. The output is therefore at 28 volts indicating that no majority of the inputs are satisfied. In order for the output to drop to ground potential it is necessary that at least one of transistor pairs 30, 50 or 46, 54 be rendered conductive, and it is clear that this cannot happen if none, or only a single one, of the inputs are present. On the other hand, if inputs A and C are satisfied, for example, input A turns on transistors 30 and 54 while input C turns on transistors 46 and 50. The output therefore drops to ground potential, rather than rising as in FIG. 3, to indicate that at least two of the inputs are present. Once again, redudant circuit paths have been established and any single component failure will not affect the output.

While the invention has been particularly shown and described with reference to preferred embodiments thereof, it will be understood by those skilled in the art that various changes in form and details may be made therein without departing from the spirit and scope of the invention.

What is claimed is:

1. A majority voter for three inputs A, B and C comprising:

(a) input means adapted to receive solely the three inputs A, B and C, (b) a first OR gate supplied with inputs A and B and having an output, (c) a second OR gate supplied with inputs B and C and having an output, (d) a first AND gate supplied with input C and the output from the first OR gate, (e) a second AND gate supplied with input A and the output from the second OR gate, whereby redundant circuit paths are established for input combinations AC and ABC, and (f) output coupling means for the first and second AND gates.

References Cited

UNITED STATES PATENTS

| | | | |
|---|---|---|---|
| 2,934,271 | 1960 | Kessel | 307—218 |
| 3,134,032 | 1964 | Mann | 307—218 |
| 3,201,701 | 8/1965 | Maritra | 307—218 |
| 3,226,569 | 12/1965 | James | 307—204 |
| 3,317,721 | 5/1967 | Berlind | 307—216 |
| 2,910,584 | 10/1959 | Steele | 382—92 |

DONALD D. FORRER, Primary Examiner

H. A. DIXON, Assistant Examiner

U.S. Cl. X.R.

307—204